United States Patent
Tan

(10) Patent No.: US 10,519,351 B2
(45) Date of Patent: Dec. 31, 2019

(54) METHOD FOR MAKING QUICK DRYING ADHESIVE AVAILABLE FOR ARCHITECTURAL USE UNDER LOW TEMPERATURE

(71) Applicant: Nan Pao Resins Chemical Co., Ltd., Tainan (TW)

(72) Inventor: Joo Sing Tan, West Denistone (AU)

(73) Assignee: Nan Pao Resins Chemical Co., Ltd., Tainan (TW)

( * ) Notice: Subject to any disclaimer, the term of this patent is extended or adjusted under 35 U.S.C. 154(b) by 0 days.

(21) Appl. No.: 15/982,012

(22) Filed: May 17, 2018

(65) Prior Publication Data

US 2018/0298250 A1 Oct. 18, 2018

Related U.S. Application Data

(63) Continuation-in-part of application No. 15/488,670, filed on Apr. 17, 2017, now abandoned.

(51) Int. Cl.

| | |
|---|---|
| *C09J 109/06* | (2006.01) |
| *C08J 3/11* | (2006.01) |
| *C08J 3/21* | (2006.01) |
| *C08L 53/02* | (2006.01) |
| *C08K 3/26* | (2006.01) |
| *C08K 3/34* | (2006.01) |
| *C09J 157/02* | (2006.01) |
| *C08K 3/36* | (2006.01) |

(Continued)

(52) U.S. Cl.
CPC ............ *C09J 157/02* (2013.01); *C08L 53/02* (2013.01); *C08K 3/013* (2018.01); *C08K 3/346* (2013.01); *C08K 3/36* (2013.01); *C08K 5/053* (2013.01); *C08K 2003/265* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,444,117 A | 5/1969 | Higgins |
| 3,475,362 A | 10/1969 | Romanick et al. |

(Continued)

FOREIGN PATENT DOCUMENTS

| | | |
|---|---|---|
| CN | 105385373 A | 3/2016 |
| JP | 2002363475 A | 12/2002 |

*Primary Examiner* — Tae H Yoon
(74) *Attorney, Agent, or Firm* — Alan D. Kamrath; Mayer & Williams PC

(57) ABSTRACT

A method includes preparing a solvent, adding the solvent into a mixture to dissolve the mixture and to form a mixing solution, adding a filler and an additive into the mixing solution, and using a three-shaft mixer to stir and blend the solvent, the filler, the mixing solution and the additive to form a sticky quick drying adhesive. The temperature is controlled under 40° C. in the above steps. The solvent includes heptane, acetone, N-hexane and toluene which are mixed in a predetermined weight proportion. The mixture includes C9 hydrocarbon resin, C5 and C9 co-polymer hydrocarbon resin and styrene-butadiene. The filler includes calcined kaolin, calcium carbonate, anti-oxidant and fumed silica. The additive includes monoethylene glycol. Thus, the quick drying adhesive is extruded outward at a low temperature state (−15° C.).

1 Claim, 1 Drawing Sheet

(51) Int. Cl.
*C08K 3/013* (2018.01)
*C08K 5/053* (2006.01)

(56) References Cited

U.S. PATENT DOCUMENTS

| | | |
|---|---|---|
| 4,513,130 A | 4/1985 | Mizui et al. |
| 7,420,009 B2 | 9/2008 | Stauf et al. |
| 2010/0326598 A1* | 12/2010 | Atwater ................ C09J 145/02 |
| | | 156/334 |
| 2013/0299087 A1* | 11/2013 | Meyer ..................... C08K 5/07 |
| | | 156/333 |

* cited by examiner

METHOD FOR MAKING QUICK DRYING ADHESIVE AVAILABLE FOR ARCHITECTURAL USE UNDER LOW TEMPERATURE

CROSS-REFERENCES TO RELATED APPLICATIONS

The present invention is a continuation-in-part (C.I.P.) application of the U.S. Ser. No. 15/488,670, filed on Apr. 17, 2017, now abandoned.

BACKGROUND OF THE INVENTION

1. Field of the Invention

The present invention relates to newly developed solvent based construction adhesive with unique properties not found in anyone adhesives companies.

2. Description of the Related Art

The following are features that is exclusive developed
1. Extremely fast setting.
2. High green bond strength.
3. No drooling when trigger of extrusion gun is released.
4. Can extrude even as low as −15° C. and does not skin as much as common Construction adhesives. Bond can be made at this low temperature.
5. Adhesion on metals including stainless steel is better than other commonly available in the market.

BRIEF SUMMARY OF THE INVENTION

In accordance with the present invention, there is production procedure for producing this adhesive:
1. load all solvent into mixer.
2. loading part of kaolin and SBS polymer, resin, anti-oxidant in to the mixer, mix for 1 hour.
3. Load the rest of the resin, mix for 15 minutes.
4. Load the rest of the filler Kaolin and calcium carbonate to the mixer, mix for 15 minutes.
5. Load fumed silica, mix 3 minutes.
6. lad MEG, mix 3 minutes.
7. take sample for QC testing.

Components in each mixing stage are listed below.
1. Solvent composition are 2.0-5.0%, acetone with a proportion of 10-20%, N-hexane with a proportion of 10-20%, and toluene with a proportion of 1.0-5.0%.
2. The resin are C9 hydrocarbon resin, SBS triblock polymer, antioxidant and part of Kaolin Preferably, the C9 hydrocarbon resin is petroleum resin SK 120.
3. The rest of the resins are C9 and C5 hydrocarbon resins which is Luhorex A-1100.
4. Fillers are the fillers are Kaolin Clay and calcium carbonate. 5. The surface area of fumed silica is 200±25 pet surface area.
6. Monoethylene Glycol.

Preferably, C5 resin is Luhorex A1100.
Preferably, C9 Resin is Petroleum SK120.
Preferably, styrene-butadiene styrene is Taipol 3206.
Preferably, calcined kaolin is Kaolin BR95.
Preferably, the anti-oxidant is Evernox 10.
Preferably, the fumed silica is aerosil 200.

DETAILED DESCRIPTION OF THE INVENTION

Figure 1:
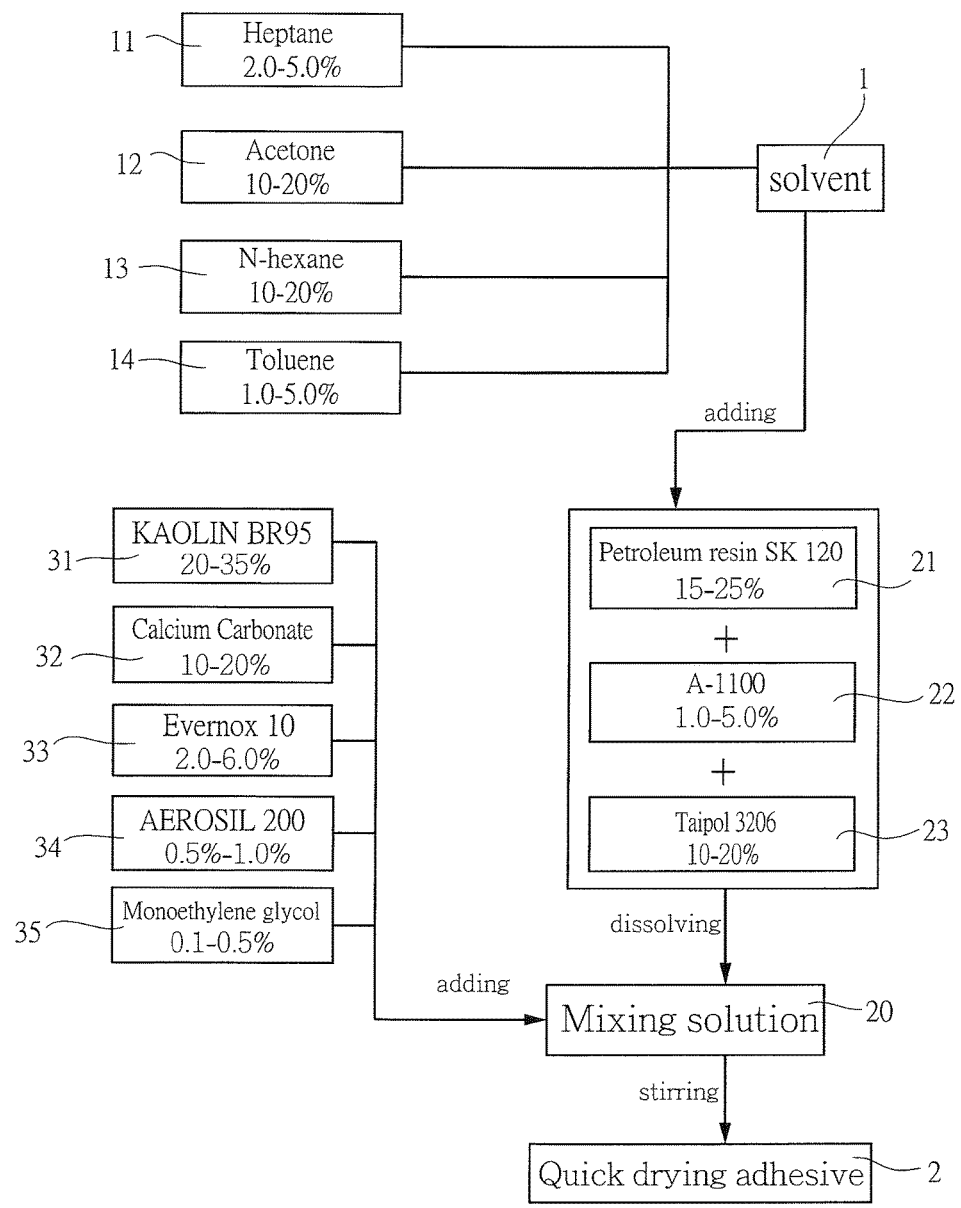
FIG. 1 is a flow chart of a method for making a quick drying adhesive in accordance with the preferred embodiment of the present invention.

Referring to FIG. 1, a method for making a quick drying adhesive in accordance with the preferred embodiment of the present invention comprises a first step (1) of preparing a solvent 1, a second step (2) of adding the solvent 1 into a mixture to dissolve the mixture and to form a mixing solution 20, a third step (3) of adding a filler and an additive into the mixing solution 20, and a fourth step (4) of using a three-shaft mixer to stir and blend the solvent 1, the filler, the mixing solution 20 and the additive to form a sticky quick drying adhesive 2. In the making procedures, the temperature is controlled under 40° C. in the first step (1), the second step (2), the third step (3) and the fourth step (4).

In the first step (1), the solvent 1 includes heptane 11 with a weight proportion of 2.0-5.0%, acetone 12 with a weight proportion of 10-20%, N-hexane 13 with a weight proportion of 10-20%, and toluene –with a weight proportion of 1.0-5.0%.

In the second step (2), the mixture includes C9 hydrocarbon resin 21 with a weight proportion of 15-25%, C5 and C9 co-polymer hydrocarbon resin 22 with a weight proportion of 1.0-5.0% and styrene-butadiene 23 with a weight proportion of 10-20%. Preferably, the C9 hydrocarbon resin 21 is petroleum resin SK 120. Preferably, the C5 and C9 co-polymer hydrocarbon resin 22 is A-1100. Preferably, the styrene-butadiene 23 is Taipol 3206. The mixing solution 20 contains the solvent 1 and the mixture that is dissolved by the solvent 1.

In the third step (3), the filler includes calcined kaolin 31 with a weight proportion of 20-35%, calcium carbonate 32 with a weight proportion of 10-20%, anti-oxidant 33 with a weight proportion of 2.0-6.0% and fumed silica 34 with a weight proportion of 0.5-1.0%. Preferably, the calcined kaolin 31 is Kaolin BR95. Preferably, the anti-oxidant 33 is Evernox 10. Preferably, the fumed silica 34 is aerosil 200. The additive includes monoethylene glycol 35 with a weight proportion of 0.1-0.5%. The weight proportion is based on a total amount of the adhesive.

In fabrication, the heptane 11, the acetone 12, the N-hexane 13 and the toluene 14 are mixed in a predetermined proportion to form the solvent 1, so that the quick drying adhesive 2 can be squeezed out quickly under a very low temperature (−15° C.). At this time, the acetone 12 increases the solubility of the styrene-butadiene 23 relative to the solvent 1, so that when the quick drying adhesive 2 is used under the very low temperature (−15° C.), the solubility of the styrene-butadiene 23 will not be reduced by decrease of the temperature, thereby preventing the styrene-butadiene 23 from being separated from the solvent 1, and thereby preventing the quick drying adhesive 2 from agglomerating and failing In the preferred embodiment of the present invention, the weight proportions of the components of the sticky quick drying adhesive 2 are listed as follows:

| Component | Description | CAS No. | w % (weight range) |
| --- | --- | --- | --- |
| (Heptane) | Solvent | 142-82-5 | 2.0-5.0% |
| (Acetone) | Solvent | 110-54-3 | 10-20% |
| (N-hexane) | Solvent | 67-64-1 | 10-20% |
| (Toluene) | Solvent | 108-88-3 | 1.0-5.0% |
| EVERNOX 10 | anti-oxidant | 6683-19-8 | 2.0-6.0% |
| TAIPOL 3206 | Linear Styrene-butadiene-styrene | 9903-55-8 | 10-20% |

-continued

| Component | Description | CAS No. | w % (weight range) |
|---|---|---|---|
| | bound styrene 25 to 32% | | |
| LUHOREZ A-1100 | C5 hydrocarbon resin | 68131-77-1 | 1.0-5.0% |
| Petroleum resin SK 120 | C9 hydrocarbon resin | 64742-16-1 | 15-25% |
| CACO3 ES 500 | CaCO3 with particle size 15-25 micron | 1317-65-3 | 10-20% |
| Kaolin BR95 | Calcined Kaolin | 1332-58-7 | 20-35% |
| AEROSIL 200 | Fumed silica | 112 945-52-6 | 0.5-1.0% |
| Monoethylene glycol | Monoethylene glycol | 107-21-1 | 0.1-0.5% |

In practice, when the quick drying adhesive 2 made by the method of the present invention is used at a low temperature state (−15° C.), the quick drying adhesive 2 can be squeezed out quickly and has an efficient bonding effect, to overcome the drawback of the conventional adhesive which cannot be compressed outward under the low temperature.

A test is applied on the quick drying adhesive 2 made by the method of the present invention to get results of the extrusion time of the quick drying adhesive 2. In the test, the quick drying adhesive 2 is available for a pneumatic glue gun with a diameter of 3.0 mm The test is to calculate the time required for extruding a determined quantity, such as 20 g, of the quick drying adhesive 2 under a constant operation pressure of 20 psi. The test is operated under an ambient temperature and a low temperature (−15° C.).

The results of the test are listed as follows:

| Tool | | | pneumatic glue gun | |
|---|---|---|---|---|
| Operation pressure | | | 20 psi | |
| Diameter | | | 3.0 mm | |
| Optimal extrusion rate | | | 10-50 seconds | |
| extrusion rate (20 g) | 1st | 2nd | 3rd | Average (second) |
| ambient temperature | 29 | 30 | 31 | 30 |
| low temperature (−15° C.) | 48 | 49 | 49 | 49 |

In general, the conventional adhesive cannot be extruded outward under the low temperature (−15° C.). In contrast, the quick drying adhesive 2 of the present invention can be extruded outward under the low temperature (−15° C.). Although the quick drying adhesive 2 is extruded under the low temperature (−15° C.) during a time longer than under ambient temperature, performance of the quick drying adhesive 2 is still better than that of the conventional adhesive.

Accordingly, the quick drying adhesive 2 can be extruded outward and used immediately at a low temperature state (−15° C.), thereby enhancing the working efficiency under the low temperature condition. In addition, the quick drying adhesive 2 still has an efficient bonding force under the low temperature condition, thereby enhancing the adhering effect of the quick drying adhesive 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A method for making a quick drying adhesive, comprising:
   a first step of preparing a solvent;
   a second step of adding the solvent into a mixture to dissolve the mixture and to form a mixing solution;
   a third step of adding a filler and an additive into the mixing solution; and
   a fourth step of using a three-shaft mixer to stir and blend the solvent, the filler, the mixing solution and the additive to form a sticky quick drying adhesive;
   wherein:
   the temperature is controlled under 40° C. in the first step, the second step, the third step and the fourth step;
   the solvent includes heptane with a weight proportion of 2.0-5.0%, acetone with a weight proportion of 10-20%, N-hexane with a weight proportion of 10-20%, and toluene with a weight proportion of 1.0-5.0%;
   the mixture includes C9 hydrocarbon resin with a weight proportion of 15-25%, C5 and C9 co-polymer hydrocarbon resin with a weight proportion of 1.0-5.0% and styrene-butadiene-styrene polymer with a weight proportion of 10-20%;
   the mixing solution contains the solvent and the mixture that is dissolved by the solvent;
   the filler includes calcined kaolin with a weight proportion of 20-35%, calcium carbonate with a weight proportion of 10-20%, anti-oxidant with a weight proportion of 2.0-6.0% and fumed silica with a weight proportion of 0.5-1.0%;
   the additive includes monoethylene glycol with a weight proportion of 0.1-0.5%; and
   the weight proportion is based on a total amount of the adhesive.

\* \* \* \* \*